United States Patent
Skarine

(10) Patent No.: US 8,086,397 B2
(45) Date of Patent: *Dec. 27, 2011

(54) MOBILE DEVICE WITH ON-SCREEN OPTICAL NAVIGATION

(75) Inventor: Alexei Skarine, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/040,337

(22) Filed: Mar. 4, 2011

(65) Prior Publication Data

US 2011/0163951 A1 Jul. 7, 2011

Related U.S. Application Data

(63) Continuation of application No. 12/627,366, filed on Nov. 30, 2009, now Pat. No. 7,917,284, which is a continuation of application No. 11/960,812, filed on Dec. 20, 2007, now Pat. No. 7,672,776, which is a continuation of application No. 10/911,583, filed on Aug. 5, 2004, now Pat. No. 7,340,342.

(30) Foreign Application Priority Data

Aug. 5, 2003 (GB) .................................. 0318358.9

(51) Int. Cl.
*G01C 21/00* (2006.01)
*G09G 5/08* (2006.01)

(52) U.S. Cl. ........................................ 701/206; 345/157

(58) Field of Classification Search .................. 701/200, 701/206, 211; 345/157
See application file for complete search history.

(56) References Cited

U.S. PATENT DOCUMENTS

| 7,340,342 B2 | 3/2008 | Skarine |
| 7,917,284 B2* | 3/2011 | Skarine .......................... 701/206 |
| 2002/0058536 A1 | 5/2002 | Horii et al. |
| 2002/0155857 A1 | 10/2002 | Nishimoto |
| 2002/0198030 A1 | 12/2002 | Shima |
| 2003/0040346 A1* | 2/2003 | Fukuda et al. ................. 455/575 |

FOREIGN PATENT DOCUMENTS

| EP | 0 957 448 A2 | 11/1999 |
| EP | 1 220 143 A2 | 7/2002 |
| GB | 2 358 983 A | 8/2001 |
| WO | WO 0075914 A1 | 12/2000 |
| WO | WO 03060816 A1 | 7/2003 |

OTHER PUBLICATIONS

Optical Mice and How They Work, Agiligent Technologies.

* cited by examiner

*Primary Examiner* — Yonel Beaulieu

(74) *Attorney, Agent, or Firm* — Ridout & Maybee LLP

(57) ABSTRACT

A mobile computing device, including a main body, a processor and associated memory housed within the main body, a display screen housed within the main body and responsive to signals from the processor, an optical sensor fixed to the main body for capturing successive images and providing image signals representative of the captured images to the processor, and a navigation module associated with the processor for determining, based on the image signals, a relative movement between the main body and a reference surface and moving a pointer on the display screen based on the determined relative movement.

7 Claims, 4 Drawing Sheets

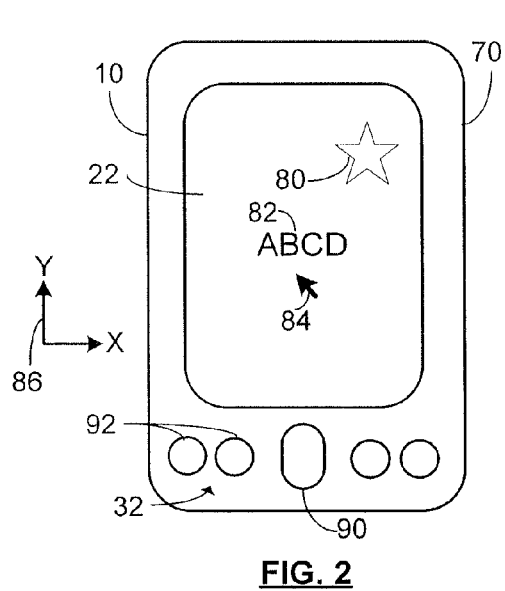
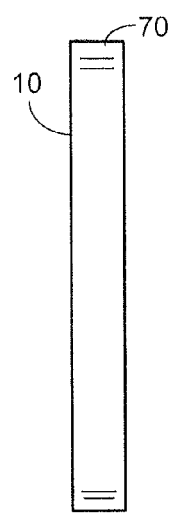
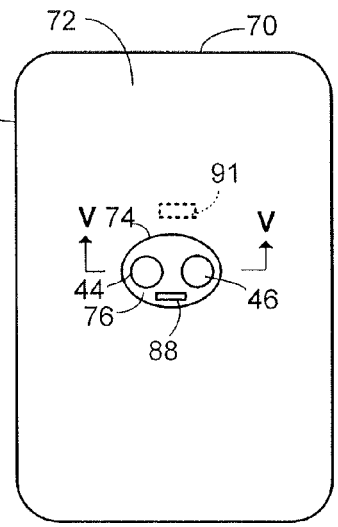
FIG. 2    FIG. 3    FIG. 4
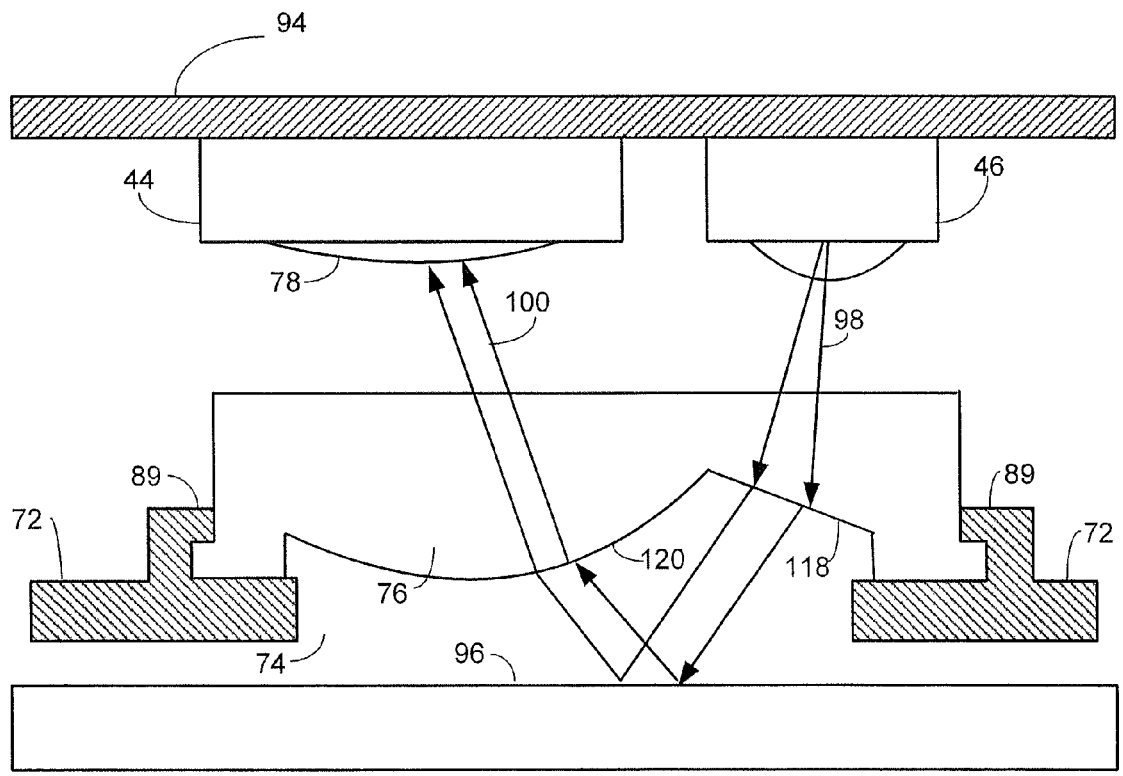
FIG. 5

MOBILE DEVICE WITH ON-SCREEN OPTICAL NAVIGATION

CROSS-REFERENCE TO RELATED APPLICATIONS

The present application is a continuation of U.S. patent application Ser. No. 12/627,366, filed Nov. 30, 2009, which is a continuation of U.S. patent application Ser. No. 11/960,812, filed Dec. 20, 2007, now U.S. Pat. No. 7,672,776, which is a continuation of U.S. patent application Ser. No. 10/911,583, filed Aug. 5, 2004, now U.S. Pat. No. 7,340,342; and which claims priority to United Kingdom patent application serial no. 0318358.9 filed Aug. 5, 2003, now U.S. Pat. No. 2,404,819, all of which are hereby incorporated by reference in their entirety.

FIELD OF THE APPLICATION

The present application relates generally to the field of mobile devices having display screens and, in particular, to mobile devices having optical sensors.

BACKGROUND OF THE INVENTION

Mobile devices, such as personal digital assistants and messaging enabled communications devices are rapidly growing in popularity. More features are being incorporated into mobile devices. For example, there are now messaging enabled mobile phones that have display screens and built-in-cameras. Such phones allow images taken by the camera to be displayed on screen, stored on the phone and wirelessly transmitted as digital photos. The use of an integrated camera as an input interface for a mobile communications device has been proposed, whereby image information from the camera is converted to text data which can be used as a phone number, Internet address, or mail text to support calling, Internet connection or mail passing.

Due to the compact size and portability of handheld mobile devices, the range of input interfaces for on-screen navigation is typically more limited for such compact devices than for larger devices such as laptop and desktop computers. Rather than using optical or roller ball mice, touch pads, or joysticks to move an on-screen pointer or cursor, navigation control on handheld devices typically relies on a directional keypad, a stylus, and/or other input devices such as a thumbwheel.

Thus, there is a need for an alternative input interface for on-screen navigation in mobile devices.

SUMMARY OF THE INVENTION

According to the present invention, an on-board optical sensor on a mobile device is used to detect relative movement of the device and a reference surface, and move an on-screen pointer accordingly. In some embodiments, the optical sensor may also be used as in various modes as a camera and a scanner.

According to example aspects of the invention, there is provided a mobile device, including a main body, a processor and associated memory housed within the main body, a display screen housed within the main body and responsive to signals from the processor, an optical sensor fixed to the main body for capturing successive images and providing image signals representative of the captured images to the processor; and a navigation module associated with the processor for determining, based on the image signals, a relative movement between the main body and a reference surface and moving a pointer on the display screen based on the determined relative movement.

According to other aspects of the invention, there is provided an on-screen navigation method for a mobile device having a display screen. The method includes (a) fixing an optical sensor for movement with the display screen; (b) displaying an on-screen pointer on the display screen; (c) capturing successive images of a reference surface through the optical sensor; (d) comparing successive captured images to determine a relative movement between the optical sensor and the reference surface; and e) moving the on-screen pointer on the display screen based on the determined movement.

According to yet a further aspect of the present application, there is disclosed a mobile device. The mobile device includes a main body having a front face and opposing back face; a processor and associated memory housed within the main body; a display screen mounted in the front face; an optical sensor mounted in the back face for capturing successive images and providing image signals representative of the captured images to the processor; and a navigation module executable by the processor for converting the image signals into lower resolution image signals and determining, based on the lower resolution image signals, a relative movement between the main body and a reference surface and moving a pointer on the display screen based on the determined relative movement.

Accordingly to yet another aspect of the present application, there is disclosed a on-screen navigation method for a mobile computing device having front face with a display screen and having a back face. The method includes displaying an on-screen pointer on the display screen; capturing successive images of a reference surface using an optical sensor mounted in the back face; converting the successive images into lower resolution images; comparing successive lower resolution images to determine a relative movement between the optical sensor and the reference surface; and moving the on-screen pointer on the display screen based on the determined movement.

According to another aspect of the present application, there is disclosed a mobile device. The device includes display means for displaying a pointer; camera means for capturing successive images and providing image signals representative of the captured images; navigation means for receiving the image signals and determining, based on the image signals, a relative movement between the main body and a reference surface and moving a pointer on the display means based on the determined relative movement; and a casing having a front face and a back face, and wherein the display means is mounted in the front face and the camera means is mounted in the back face.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein:

FIG. 2 is a front view of the mobile device of FIG. 1;

FIG. 3 is a side view of the mobile device;

FIG. 4 is a back view of the mobile device;

FIG. 5 is a partial section view of the mobile device, taken along lines V-V of FIG. 4;

Like reference numerals are used throughout the Figures to denote similar elements and features.

DETAILED DESCRIPTION

Figure 1:
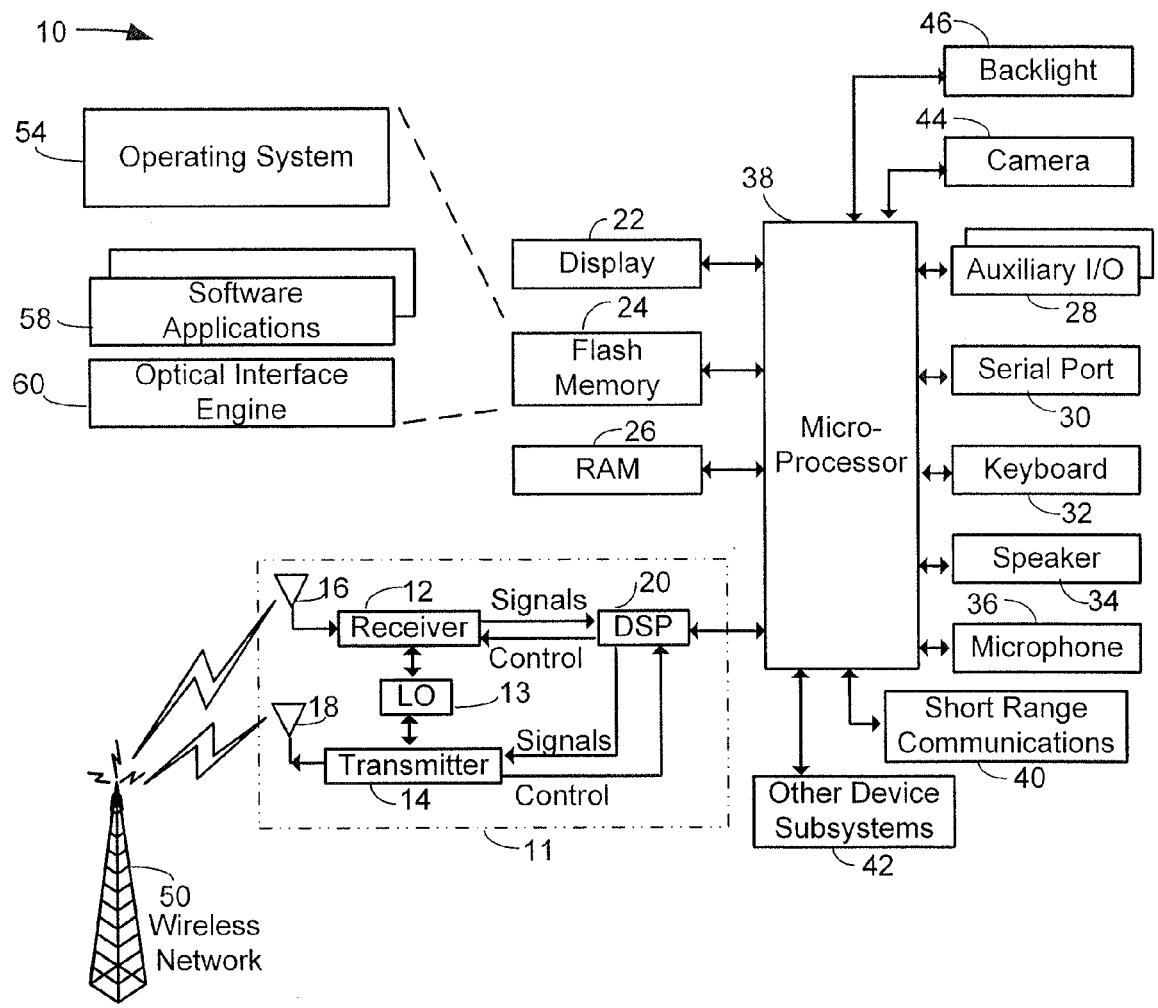
FIG. 1 is a block diagram showing a mobile device to which the present invention may be applied.

Referring now to the drawings, FIG. 1 is a block diagram of a mobile device 10 to which the present invention is applied in an example embodiment. In the example embodiment, the mobile device 10 is a handheld two-way mobile communication device having at least data and possibly also voice communication capabilities. In an example embodiment, the device 10 has the capability to communicate with other computer systems on the Internet. Depending on the functionality provided by the device 10, in various embodiments the device 10 may be a data communication device, a multiple-mode communication device configured for both data and voice communication, a mobile telephone, a PDA (personal digital assistant) enabled for wireless communication, or a computer system with a wireless modem, among other things. In various embodiments, the present invention may also be applied to handheld computing devices, such as PDAs and digital cameras that are not enabled for communications.

The device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem 11 includes local oscillator(s) (LO) 13, and in some embodiments the communication subsystem 11 and microprocessor 38 share an oscillator. As will be apparent to those skilled in the field of communications, the particular design of the communication subsystem 11 will be dependent upon the communication network in which the device is intended to operate.

Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the network 50 via the antenna 18.

The device 10 includes a microprocessor 38 that controls the overall operation of the device 10. The microprocessor 38 interacts with communications subsystem 11 and also interacts with further device subsystems such as the display 22, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The device 10 of the present system includes an integral camera 44 and backlight 46 that interact with microprocessor 38.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device 10. A predetermined set of software applications 58 which control basic device operations, including at least data and voice communication applications for example, will normally be installed on the device 10 during manufacture. Further applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device 10 and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device 10 by providing for information or software downloads to the device 10 other than through the network 50.

A short-range communications subsystem 40 is a further component that may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10, although it could be any other types of wireless networks.

With reference to FIGS. 2-4, in an example embodiment, the components and subsystems of mobile device 10 are housed within a hard plastic main body case 70 that is configured to be held with one or two hands while the device 10 is in use. The case 70 may include a hook (not shown) so that it can be secured to a user's belt or pant's top, or it may be used in conjunction with a soft case (not shown) that can be mounted to the user's belt or pant's top and into which the mobile device 10 can be inserted for carrying. Mobile device 10 will typically be small enough to fit inside a standard purse or suit jacket pocket. The screen 22 is visible from the front of the device 10, as is keypad or keyboard 32. The keyboard 32 includes buttons or keys 90, 92 positioned to be actuated by the thumbs or fingers of the user. In the illustrated embodiment of FIG. 2, the keyboard 32 has relatively few keys, however in some embodiments, the keyboard 32 includes 26 or more alphanumeric and control keys. As seen in FIG. 4, the case 70 includes a substantially planar back wall 72, which has an opening 74 provided therethrough. A lens 76 covers the opening 74, behind which camera 44 and backlight 46 are located.

As seen in FIG. 5, in an example embodiment, the camera 44 and backlight 46 are secured to the back of a printed circuit board 94 that is mounted within the main body case 70. In an example embodiment, the printed circuit board 94 also supports at least some of the other hardware electronic components of the device 10. The camera 44 includes an optical sensor 78 that faces lens 76 for receiving reflected light 100 therethrough. The backlight 46 is positioned to shine light 98 through the lens 76 onto a reference surface 96 from which it is reflected back to optical sensor 78. Although not illustrated in the drawings, as will be apparent to those persons skilled in the art, the camera 44, lens 76 and backlight 46 may be adapted to the main body 70 by a variety of other means without narrowing the scope of the invention. In a first embodiment, the camera is fixed to the main body. In a second embodiment, the camera 44, lens 76 and backlight 46 may be housed in a secondary housing (not shown) that is pivotally mounted to the body 70 of the device 10. In yet another embodiment, the secondary housing may be removably attached to the body 70 of the device 10.

Referring now to FIGS. 1 and 2, at least some of the specialized software applications 58 that are loaded onto the device 10 will, together with operating system 54, implement graphical user interfaces that display text 82 and/or graphics 80 on the screen 22, along with a pointer 84 or other on-screen indicator that a user can selectively position on screen 22 to navigate among displayed selectable text and/or graphic images that represent data or commands. According to embodiments of the present invention, camera 44 functions, in various modes, as a user input device for controlling the movement of on-screen pointer 84, as a camera for capturing still photo or video images, and as a scanner, among other things. The device 10 includes as one of the specialized software applications an optical interface engine 60 for processing signals received by the microprocessor 38 from the camera 44 in the manner described below. All or parts of the optical interface engine 60 could, in various embodiments, be integrated into the operating system 54 and/or other specialized applications 58. In some embodiments some of the optical interface engine functions could be implemented in appropriately configured hardware that may be located within the main body 70 or in the same housing as the camera 44.

Figure 6:
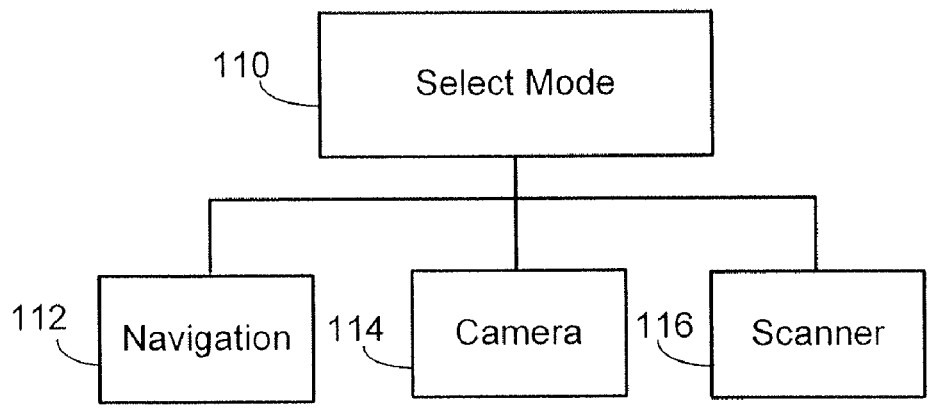
FIG. 6 is a block diagram of operating modules associated with operating modes of a camera of the mobile device according to embodiments of the present invention.

FIG. 6 represents various modules of the optical interface engine 60 according to example embodiments of the invention, which are associated with operating modes of the camera 44 when it is active. More particularly, navigation module 112, digital camera module 114, and scanner module 116 are associated with an optical navigation mode, a digital camera mode, and a scanner mode, respectively. In various embodiments, the camera 44 can be configured to have fewer or greater than three operating modes. In optical navigation mode, the received images from the camera 44 are used to control on screen navigation, as will be explained in greater detail below.

In digital camera mode, the camera 44 acts as a conventional digital camera, capturing colour still photo images or digital video images, which, among other things, can be stored as image files in a memory of the device 10, viewed on the screen 22, and sent as image files over the network 50 to a destination address.

In scanner mode, the camera 44 is used to recognize images representing alphanumeric data and convert the captured images into digital alphanumeric data. For example, in one embodiment, scanner mode has two sub-modes, namely a barcode scanning mode and an optical character recognition mode. In barcode scanning mode, the camera 44 is used to read barcode information that is then converted by device 10 to a numeric or alphanumeric value that can, among other things, be stored in memory of the device 10, displayed on display 22, and/or transmitted over the network 50 to a destination address. In optical character recognition mode, recognized alphanumeric characters in scanned images are, among other things, stored in memory of the device 10, displayed on display 22, and/or transmitted over the network 50 to a destination address. Optical character recognition mode can be used to scan contact information from business cards to an electronic address book, for example.

A select mode module 110 implements a select mode process for selecting among the camera operating modes. In one embodiment, during select mode process, the user is presented with an on-screen list of the various modes, from which the user can select a desired choice using keyboard 32. In other embodiments, the select mode process is configured to automatically choose between at least two camera modes based on the images that the camera is currently capturing. For example, when the captured images indicates that the camera 44 is within a threshold distance of a surface 96, navigation mode is selected, but when the camera 44 is further than the threshold distance from a surface 96, the device 10 automatically switches into a digital camera mode.

In one example embodiment, to facilitate its use in multiple modes, the optical sensor 78 is a charge coupled device (CCD) having a relatively high resolution and being color sensitive. By way of non-limiting example, the sensor 78 could have a resolution of at least 100,000 pixels, although lower resolution sensors are used in some embodiments. The camera 44 is capable of capturing successive frames of image at a predetermined frame per second capture rate.

With reference to FIG. 5, the operation of camera 44 in navigation mode according to embodiments of the invention will now be described in greater detail. In an example embodiment, when the device 10 is in navigation mode, the user holds the device 10 in one or both hands so that the back 72 of the device 10 is relatively close to a surface 96. In one embodiment, the device 10 can be held in one hand, with the other hand being used as the reference surface 96. As the device 10 is moved, the navigation module 112 is configured to track, through camera 44, the movement of the device 10 relative to surface 96 and based on the tracked movement move the on-screen pointer 84. For example, with reference to FIG. 2 and the X-Y reference axis 86, movement of the device 10 relative to the X axis a set distance results in movement of the on-screen pointer 84 in the same direction by a scaled distance. Similarly, movement of the device 10 relative to the Y axis a set distance results on a movement of the on-screen pointer 84 in the same direction by a scaled distance. When the on-screen pointer 84 is positioned at text or graphics (such as an icon) that the user desires to select, the user presses a control key such as key 90, for example to indicate a selection. In some embodiments, the movement of on-screen pointer is in the opposite direction of the actual movement of the device 10—for example, movement of the device 10 in the negative X direction results in positive X direction of the on-screen pointer, and so on.

In an example embodiment, in navigation mode, the backlight 46 is activated to provide incident lighting 98 onto surface 96 that is reflected to camera sensor 78. The backlight 46 can be a light emitting diode (LED) or other lighting device, and be operated in a pulse mode to conserve battery power. In some embodiments, the navigation module 114 is configured to pulse the backlight 46 only if the camera 44 senses insufficient light to otherwise operate properly. As seen in FIG. 5, in the illustrated embodiment, the lens 76 has a first angled portion 118 configured to direct light 98 from the backlight 46 generally onto the surface 96, and a convex portion 120 for focussing incoming light 100 on camera sensor 78. In an example embodiment, the lens 76 is slidably mounted within tracks 89 formed on the inside of cover back 72 such that a user can apply force to a small outwardly projecting tab 88 to slide the lens 76 into the case and out of the line of site of backlight 46 and camera sensor 78. A proximity switch or sensor 91 (indicated in phantom on FIG. 4) is connected to the microprocessor 38 to indicate to the optical interface engine 60 the location of the lens 76. In an example embodiment, the lens 76 is located in the closed position (as shown in FIG. 5) when the camera is in navigation mode to improve the focus of the camera and backlight on the near surface 96. In digital camera mode, the lens 76 can be opened (slid out of the way) to allow the camera to focus on further objects. In some embodiments, the backlight 46 may also be used in camera mode in low light conditions. In one embodiment, select mode module 110 is configured to toggle between navigation mode and camera mode depending on the location of lens 76 as detected by proximity switch 91.

Figure 7:
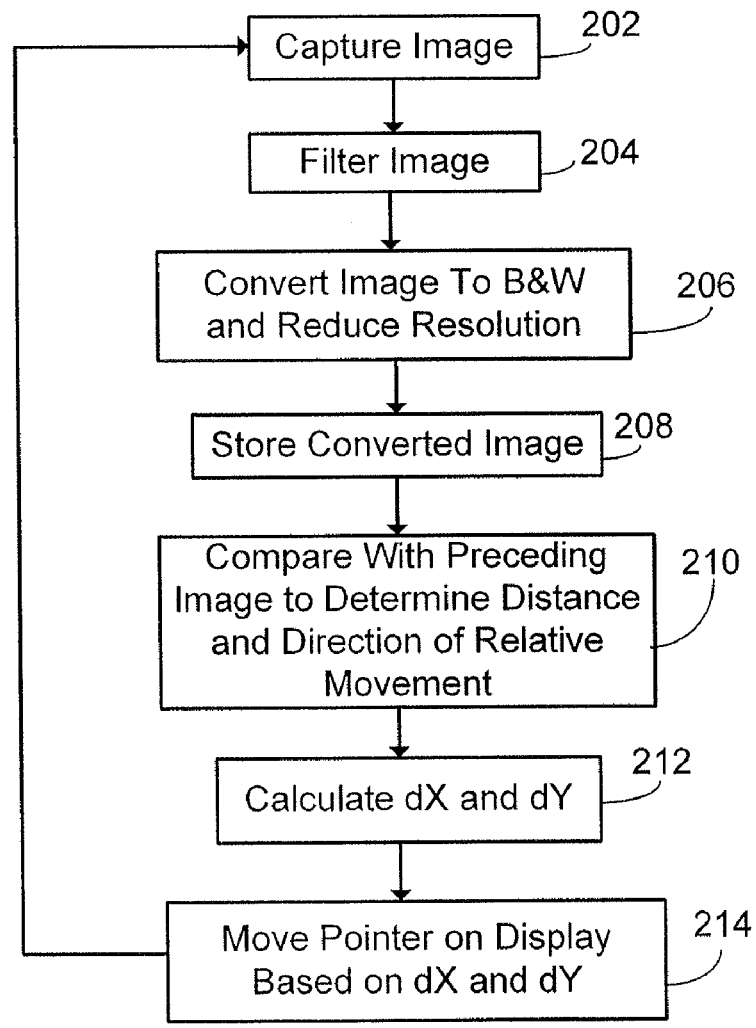
FIG. 7 is a block diagram showing an optical navigation process according to embodiments of the invention.

FIG. 7 shows a block diagram representation of a navigation process carried out by navigation module 112 according to example embodiments of the invention. During the navigation process, the camera 44 periodically captures images of the surface 96 at a predetermined capture rate (typically measured in frames per second). FIG. 7 represents the processing of a single image frame. As indicated in step 202, the device 10 is configured to capture an image, and as indicated in step 204, the image is then filtered using methods known in the art to, among other things, sharpen contrast and adjust brightness. In navigation mode the color capacity and full resolution of the camera 44 is not required, thus to accommodate for the limited processing resources that mobile devices typically have, in an example embodiment the filtered image is converted to a sharp contrast black and white or grey scale image, and then reduced in resolution by, in various embodiments, combining pixels into clusters and/or discarding selected pixels as indicated in step 206. By way of non-limiting examples, in various example embodiments, the resolution of the image is reduced to a relatively low resolution image such as 32 by 32 pixels or 16 by 16 pixels, although other resolutions can also be used. Such conversion simplifies processing of the images.

As indicated in step 208, the converted image is then stored in a navigation image buffer so that it can be compared with preceding and successive images. As indicted in step 210, the stored converted image is compared with one or more preceding stored converted images to determine the relative distance that the device 10 has moved since the preceding image, and the direction of relative movement. This information is then translated into relative movement along X and Y coordinates (dX and dY), as indicated in step 212.

By way of non-limiting example, a modified Reichardt algorithm can be used to process the converted, low resolution images to determine dX and dY. In this algorithm, motion is detected by locating the zero-crossing edges of images and determining their appearance or reappearance in sequential images. Common features between two sequential images are identified to determine the distance between them. This information is then translated into X and Y coordinates. The speed of movement is also calculated based on the image capture rate (which is a known value) and the calculated distance moved between images.

As indicated in Step 214, the on-screen pointer 84 is moved based on dX and dY. In one embodiment, the direction that the on-screen pointer 84 is moved corresponds to the calculated direction of movement of the device 10. In another embodiment, the on-screen pointer 84 is moved in the opposite direction of the movement of the device 10. The distance the on-screen pointer 84 is moved is a scaled value of dX and dY, with the scaling factor depending on the movement distance and speed. Steps 202-214 are repeated continuously while the device 10 is in navigation mode. Once the pointer 84 is in a desired position, the user uses one or more predetermined keys 92 and 90 for selection and control functions. In various embodiments, some of the steps of FIG. 7 are omitted and/or performed in an order other than as shown.

Figure 8:
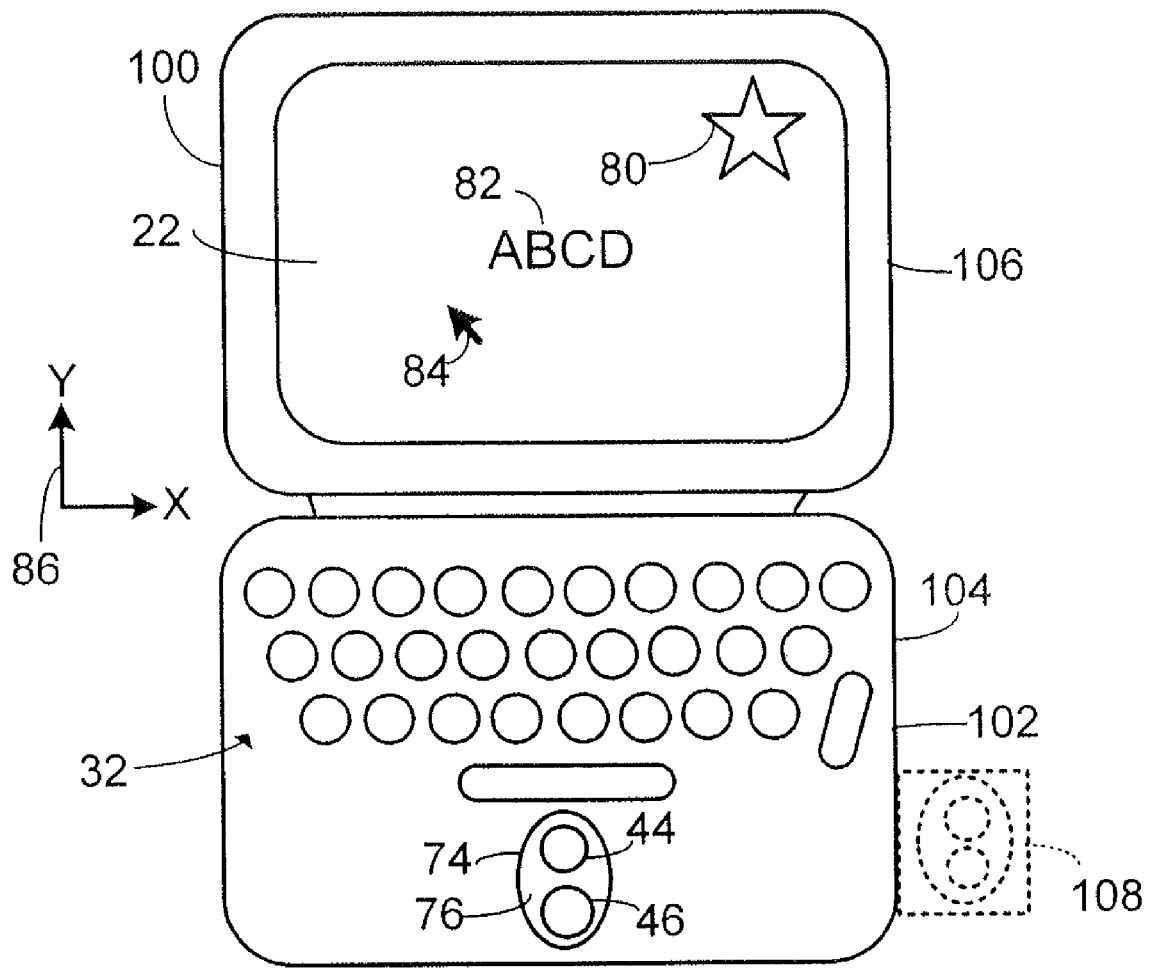
FIG. 8 is a front view of a mobile device according to another example embodiment of the invention.

Thus, it will be appreciated that the present invention allows an on-board camera 44 to be used as an on-screen navigation device. In various embodiments, the camera 44 is located in different locations than on the back of the device 10, and the device 10 has different configurations other than the example embodiment described above. For example, the camera 44 may be located facing outward from the keyboard 32, such that a user can navigate by moving the palm of their hand or their thumb over the keyboard area. By way of non-limiting example, FIG. 8 shows a front view of a handheld device 100 according to another embodiment of the invention. Handheld device 100 is similar to device 10, however the keyboard 32 of handheld device 100 includes a thumb-activated QWERTY keyboard next to which camera 44 is located, and the main body or case 102 of the handheld device 100 includes first case portion 104 and second case portion 106 that are pivotally mounted together. Second case portion 106 houses display 22, and the first case portion 104 houses the keyboard 32, which is configured for thumb typing. In handheld device 100, the lens 76 for camera 44 and backlight 46 is provided through opening 76 on the front of the first case portion 104. The camera 44 faces the same direction as the keyboard 32 for detecting relative motion of a user's hand or thumb over the keyboard surface of the handheld device 100.

In some embodiments, the camera is pivotally mounted to the case of the handheld device such that it can be rotated to face in a direction desired by the user for navigation purposes. By way of example, a pivotally mounted camera 44 and backlight unit 108 are shown by dashed lines in FIG. 8. The camera 44 and backlight unit 108 may be detachable from case 102.

In some embodiments where camera and scanner modes are not required, a low resolution optical sensor may be used in place of camera 44. In some embodiments, the lens 76 may be removable such that it can be replaced with a lens adapted specifically for the mode that the device 10 is operating in —for example a different lens could be used for navigation mode than for camera mode.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A mobile device, comprising:
    display means for displaying a pointer;
    camera means for capturing successive images and providing image signals representative of the captured images;
    a casing having a front face and a back face, and wherein the display means is mounted in the front face and the camera means is mounted in the back face; and
    navigation means for receiving the image signals and determining, based on the image signals, a relative movement between the casing and a reference surface and moving the pointer on the display means based on the determined relative movement.

2. The device of claim 1 wherein the navigation means includes means for converting the image signals to lower resolution image signals and determining the relative movement based on the lower resolution image signals.

3. The device of claim 2 wherein the camera means includes means for capturing high resolution color image signals and the means for converting includes means for converting the high resolution color image signals to lower resolution grey scale image signals.

4. The device of claim 1 wherein the navigation means includes means for comparing the successive images captured by the camera means at a predetermined capture rate to determine a relative direction, distance and speed of movement of the casing relative to the reference surface, and means for moving the pointer on the display screen based on the determined relative direction, distance and speed.

5. The device of claim 1 wherein the device further includes an imaging means executable by the processor for displaying the captured images on the display means, the imaging means and the navigation means being selectively operable to cause the captured images to be displayed on the display means in a camera mode of the device and the pointer to be moved on-screen based on the captured images in a navigation mode.

6. The device of claim 5 further comprising a select mode means for selecting between the camera mode and the navigation mode.

7. The device of claim 6 wherein said select mode means receives said captured images and determines, based upon said captured images, whether said optical sensor is within a threshold distance from the reference surface, and wherein said select mode means includes means for automatically selecting between said navigation mode and said camera mode based upon said determination.

* * * * *